Feb. 11, 1947.    G. OGURKOWSKI    2,415,653
ELECTRICAL-FREQUENCY RESPONSIVE RELAY CIRCUIT
Filed Feb. 18, 1943

INVENTOR
GEORGES OGURKOWSKI
BY Morgan Finnegan & Durham
ATTORNEYS

Patented Feb. 11, 1947

2,415,653

UNITED STATES PATENT OFFICE 2,415,653

ELECTRICAL-FREQUENCY RESPONSIVE RELAY CIRCUIT

Georges Ogurkowski, Zug, Schönbühl, Switzerland, assignor to Landis & Gyr, A. G., a corporation of Switzerland Application February 18, 1943, Serial No. 476,253
In Switzerland March 26, 1942

2 Claims. (Cl. 175—320)

The invention relates to a combined frequency relay and wattmeter system for use in conditions where a plurality of tariffs for meter operation may be necessary. In connection with the use of multitariff meters, it is old to associate a separate alternating current relay for controlling the operation thereof. Such a relay as a rule has a frequency responsive element in the form of a metallic spring and is adapted to respond to one particular frequency for operating the relay. Due to the sharp selectivity of such springs and difficulty in alining springs to a single frequency, it is frequently necessary to vary the signalling frequency over a band in order to insure that the exact frequency for operating each one of a number of relays is included.

By virtue of this invention, a relay system is provided which is responsive to a band of frequencies rather than a single frequency as above. In addition, the current and voltage coils of a wattmeter operating on the induction type are utilized as part of a relay structure and so combined with other reactance elements as to provide a combined meter and broad band relay. In the use of such combined meter and relay, it is customary to transmit signalling impulses of a frequency substantially different from the power frequency in which the meter operates. Thus as a rule the power frequency may have a certain definite value, while the signalling frequency or band of frequencies may have a higher value and, in this instance, may run from three hundred to one thousand cycles. It is understood, of course, that even though the meter coils are tuned so that the coil circuits are resonant to a band of frequencies, such as three hundred cycles to one thousand cycles, nevertheless current can be forced through these coils at frequencies other than that included in the band. In accordance with well known theory, the voltage required for forcing a current through may be higher than under resonant conditions.

Figure 1:
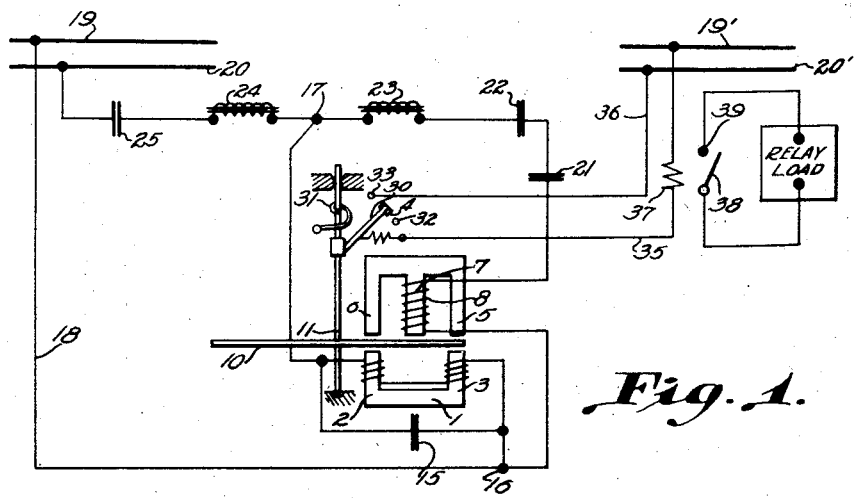
Figure 2:
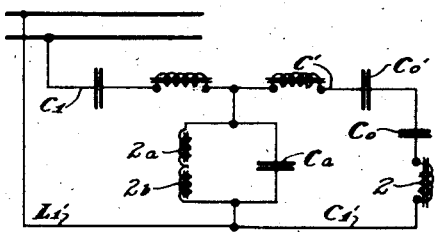
Figure 3:
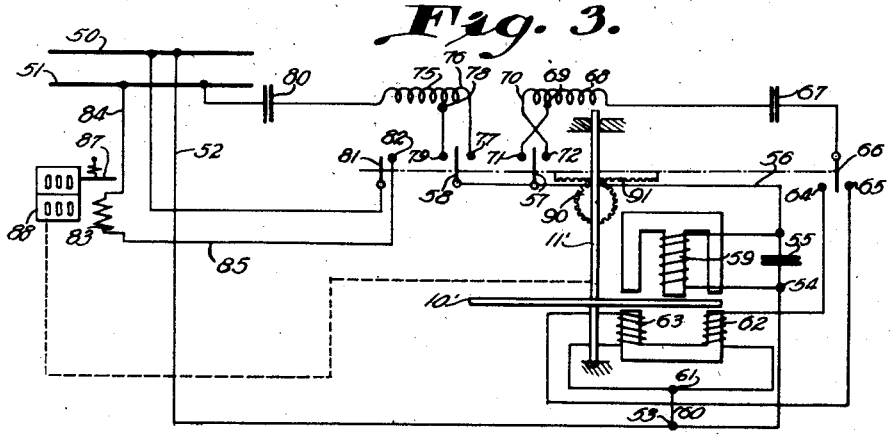

Referring now to the drawing, Figure 1 shows a combined meter and relay system adapted to be controlled by intermittent signalling frequencies. Figure 2 shows a circuit diagram of the relay. Figure 3 is a modified form of the system shown in Figure 1, changed to require the application of one of two separate signalling frequency bands to determine separate meter operating conditions.

Referring first to Figure 1, a meter is shown having a voltage coil magnetic structure 1 shaped in the form of a U and having wound on the two legs thereof a pair of series connected voltage coils 2 and 3. A current magnetic structure having outer legs 5 and 6 and a central leg 7 is adapted to cooperate with magnetic structure 1 in the usual manner. Around center leg 7 is disposed a current coil 8.

The two magnetic structures 1 and 5 are disposed with the legs facing each other as shown and have therebetween a metal disk 10 mounted for rotation on a shaft 11 journaled in suitable bearings. As is well known, this meter forms a small induction motor tending to drive disk 10 with a velocity proportional to the product of the currents in the current and voltage coils. In order for a torque to be developed in disk 10, it is essential that the magnetic flux due to one coil, such as the voltage coil, be out of phase with respect to the magnetic flux due to the current coils, the torque being a product of the two currents and the sine of the phase angle. The meter shaft 11 may have associated therewith suitable computing mechanism well known in the art.

In order for the meter to be used as an alternating current relay, voltage coils 2 and 3 are normally tuned by a condenser 15 to form a parallel resonant circuit. Voltage coils 2 and 3 are connected across points 16 and 17 of a branch circuit. This branch circuit consists of a wire 18 taken off line 19 of a pair of transmission wires 19 and 20. Wire 18 goes to point 16 and then continues on to current coil 8, a tuning condenser 21, a second condenser 22, an inductance 23, point 17, a second inductance 24 and a condenser 25 back to transmission wire 20.

The various condensers and inductances are so chosen that together with the voltage and current coils there is formed a band pass circuit, resonant to a band of frequencies such as three hundred to one thousand cycles, as previously indicated. As may be seen from Figure 2, current coil 8 with its tuning condenser 21 function also as a terminating impedance for the circuit. Hence in the design of this circuit this factor must be taken into consideration.

Parallel resonant circuit 2, 3 and 15 has, as shown in Figure 2, the series circuit 23, 22, 21 and 8 in parallel therewith. Condenser 25 and inductance 24 are in series to this entire parallel combination. Thus considerable flexibility of design is inherent without requiring any change in normal meter coils. The condensers may be variable to tune the system. Thus a highly selective but reasonably broad band resonant circuit may be designed. Within the admitted frequency bands, the arrangement of current and voltage coil circuits will provide a satisfactory phase angle between the currents in these coils to generate substantial disk torque. The voltage coil, having a higher resistance than the current coil, is protected from full line voltage by condenser 25 whereas current coil 8 is blocked by three series condensers. In tuning, it is understood that there is sufficient resistance in the tuned circuits to prevent the existence of damaging currents. Such a practice is well known.

The connections as shown in Figure 1 normally exist when the system functions as a relay. It is understood that when the meter is actually functioning as such, current coil 8 must have passing through it either all or a fixed proportion of the current taken by some load not shown. As shown in Figure 1, the meter structure is altered in the following particulars to enable it to perform a relay function, in addition to the use of the meter coils as part of a band responsive circuit. Thus meter shaft 11 may carry a contact arm 30 and be normally biased to a position of rest by a spiral spring 31 on the shaft 11. A fixed stop 32 may cooperate with contact arm 4 to determine a rest position for the shaft and contact arm. Upon passage of signal impulses through the meter coils from transmission line 19 and 20, such impulses being at a frequency within the band to which the relay is responsive, a torque will be set up in disk 10 tending to turn it against the tension of spiral spring 31. It is understood, of course, that the coils and magnetic structure are so designed that the torque on the disk is in the right direction. Upon the occurrence of this torque, contact arm 30 may be moved away from its fixed stop 32 to engage a contact 33. Contact arm 30 and fixed contact 33 are connected respectively to wires 35 and 36, forming part of a relay control circuit.

Wire 36 may be connected directly to a wire 20', while wire 35 is connected through a relay coil 37 to wire 19'. 19' and 20' may either be a local source of energy or may be continuations of transmission line 19 and 20. In any event, it is only necessary that 19' and 20' furnish energy to actuate relay coil 37 upon the closure of contacts 30 and 33. Upon the energization of relay coil 37, a movable contact 38 is attracted to close with a fixed contact 39 forming part of a relay load for changing the condition of the meter system. It is understood that in the relay circuit controlled by contact 38 and 39 a suitable source of energy is included.

Referring now to Figure 3, a transmission line 50 and 51 is shown which, like 19 and 20 in Figure 1, may carry both power and signalling frequencies. From wire 50 a connection 52 is taken to point 53, this wire continuing on to point 54, thence connects to a condenser 55. From condenser 55 a wire 56 is taken and terminates in a pair of movable contacts 57 and 58. A current coil 59 is connected across condenser 55. From junction point 53 a jumper 60 is taken to junction point 61, this junction point being where the terminals of two voltage coils 62 and 63 meet. Voltage coil 62 goes on to terminate in a fixed contact 64, while voltage coil 63 terminates in a fixed contact 65, both forming part of a pair of relay contacts as shown.

Cooperating with fixed contact 64 and 65 is a movable contact 66 going on to a condenser 67 and then to tuning inductance 68 having a tap 65 and a terminal 70. Tap 69 is connected to a fixed contact 71, while terminal 70 is connected to a fixed contact 72 of a relay system of contacts and cooperates with movable contact 57. A second tuning inductance 75 has its terminal 76 connected to a relay contact 77, while a tap 78 thereon is connected to another relay contact 79, both relay contacts 77 and 79 cooperating with movable contact 58. Tuning inductance 75 continues on through a condenser 80 to line 51.

Movable contacts 66, 57 and 58 are all mounted on suitable mechanism so as to move together. An additional movable contact 81 cooperates with a fixed contact 82 to close a relay winding 83 energized by branch wires 84 and 85 from lines 50 and 51. Relay winding 83 may cooperate with an armature 87 to change a computing mechanism 88 from one gear ratio to another to select one of two meter tariffs.

It is understood that computing mechanism 88 is mechanically coupled to meter shaft 11' so that rotation of the latter will actuate the computing mechanism in a manner well known in the art. The meter itself, including the magnetic structures, may be generally similar to that shown in Figure 1 with the following difference. Carried by shaft 11' of the meter is a suitable means, here shown as gear 90, for cooperating with mechanical means 91 such as a rack connecting together all the movable contacts 66, 57, 58 and 81.

Assuming the movable contacts are moved to the right, then the following circuit is established: line 51, condenser 80, entire coil 75, contacts 77 and 58, contacts 57 and 72, entire coil 68, condenser 67, contacts 66 and 65, voltage coil 63, jumper 60 to line 50. Across coil 68, condenser 67 and coil 63 all in series is connected the parallel combination of condenser 55 and current coil 59. When the movable contacts are moved to the left, coils 75 and 68 lose part of their inductance due to reduced effective turns, and voltage coil 62 replaces voltage coil 62. By suitable design and tuning of condensers, it is possible to have the two systems of circuits resonant to two signal frequency bands, separated to avoid any common frequency.

As in all electrical switching systems, the relay here should tend to remain in one or the other position and have no tendency to remain in an off position. Thus if the relay is in one position, impressing the first necessary signal frequency will cause it to assume its other position. In the other position, the relay is no longer resonant to the first signal frequency so that even if still present, no dangerous disk torque will be generated. When a relay position change is desired, a second necessary frequency will be impressed. Since the relay is in condition to respond to it, there will be a change of relay position back to the one position. Thus two different relay positions may be selected.

What is claimed is:

1. A relay for a wattmeter system comprising an induction type wattmeter structure including magnetic cores, voltage and current coils wound on said cores, a rotatable disk mounted between said cores, means for limiting the rotation of said disk to a prescribed range, tuning condensers connected to said coils, double throw switching means for controlling the tuning of said coil system, said coil system being tuned to two different frequencies in the two switch positions, means connecting said disk and said switch whereby one switch position is established at one end of said disk travel and the other switch position is established at the other end of said disk travel whereby either one of said switch positions may be selected by selecting the signal frequency.

2. The system of claim 1 wherein said coil system is tuned to a band of frequencies in each switch position, said two frequency bands being separated in the frequency spectrum.

GEORGES OGURKOWSKI.

REFERENCES CITED

The following references are of record in the file of this patent:

UNITED STATES PATENTS

| Number | Name | Date |
|---|---|---|
| 2,131,424 | Bechberger | Sept. 27, 1938 |
| 706,575 | Lunt | Aug. 12, 1902 |
| 2,246,185 | Pratt | June 17, 1941 |
| 1,911,346 | Bohner | May 30, 1933 |
| 1,957,010 | Chirol | May 1, 1934 |
| 2,139,821 | Greenwood et al. | Dec. 13, 1938 |
| 1,801,302 | Beusch | Apr. 21, 1931 |
| 1,996,145 | Chirol | Apr. 2, 1935 |
| 2,013,815 | Wensley | Sept. 10, 1935 |
| 1,716,752 | Austin | June 11, 1929 |
| 2,131,164 | Chauveau | Sept. 27, 1938 |

FOREIGN PATENTS

| Number | Country | Date |
|---|---|---|
| 496,178 | German | Apr. 16, 1930 |
| 339,807 | British | Dec. 21, 1929 |
| 694,463 | German | Aug. 1, 1940 |